United States Patent [19]

Berkeley et al.

[11] Patent Number: 5,000,237
[45] Date of Patent: Mar. 19, 1991

[54] JOINTER CUTTER GUARD WITH FEATHERBOARD

[75] Inventors: James E. Berkeley, Dayton; David D. Flora, Arcanum, both of Ohio

[73] Assignee: Shopsmith, Inc., Dayton, Ohio

[21] Appl. No.: 542,999

[22] Filed: Jun. 25, 1990

[51] Int. Cl.$^5$ .............................................. B27G 19/00
[52] U.S. Cl. ............................ 144/251 B; 144/251 A; 144/253 F; 144/253 J
[58] Field of Search ........... 144/251 R, 251 A, 251 B, 144/253 R, 253 F, 253 J

[56] References Cited

U.S. PATENT DOCUMENTS

| | | |
|---|---|---|
| 767,545 | 8/1904 | Davidsen . |
| 944,976 | 12/1909 | Spady . |
| 998,873 | 7/1911 | Couture . |
| 1,788,663 | 1/1931 | May .............................. 144/251 B |
| 1,801,326 | 4/1931 | Boisvert ......................... 144/251 B |
| 2,521,499 | 9/1950 | Boisvert ......................... 144/251 B |
| 2,705,034 | 3/1955 | Gaskell .......................... 144/251 B |
| 2,747,628 | 4/1956 | Ford .............................. 144/249 R |
| 2,894,546 | 7/1959 | Eschenburg .................... 144/251 B |
| 2,895,517 | 7/1959 | Rhett ............................. 144/251 B |

*Primary Examiner*—W. Donald Bray
*Attorney, Agent, or Firm*—Biebel, French & Nauman

[57] ABSTRACT

A guard as disclosed for use with a woodworking tool such as a jointer having a worktable, a cutter head and a guide fence for guiding a workpiece through the jointer. The guard is pivotally mounted to the table and is biased toward the guide fence such that it covers the cutter head when a workpiece is not present. The guard includes a body portion and flexible fingers formed integrally with and extending from the body portion toward the guide fence. The flexible fingers act as a featherboard during a jointing operation and the pivotal movement of the guard may be limited such that the fingers engage a workpiece as it is fed through the jointer to thereby apply a biasing force against the workpiece toward the guide fence. The fingers further act to resist movement of the workpiece in a direction opposite to the feed direction during a kickback situation and thereby provide greater control over the workpiece.

14 Claims, 3 Drawing Sheets

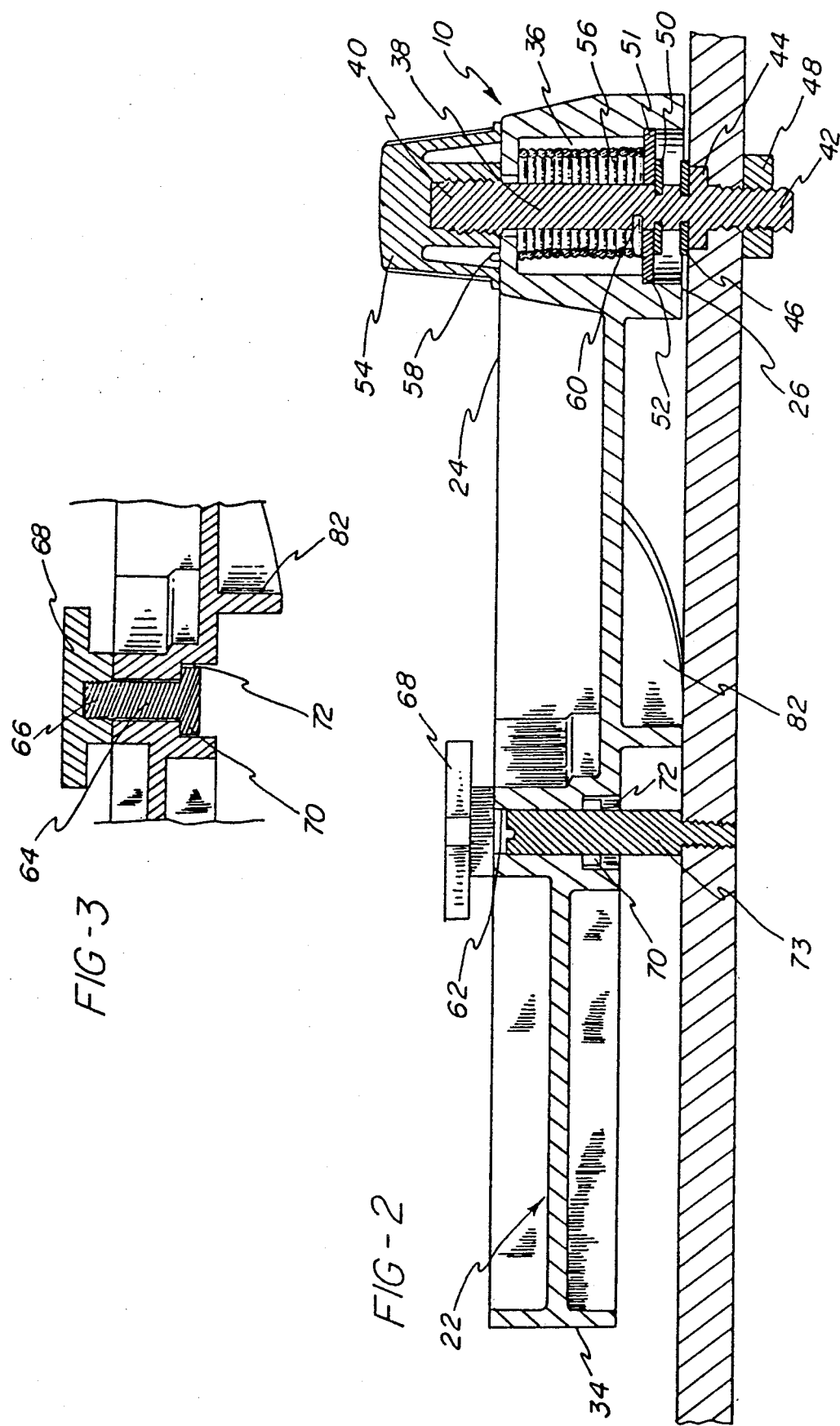

JOINTER CUTTER GUARD WITH FEATHERBOARD

BACKGROUND OF THE INVENTION

The present invention relates generally to a guard for use with a woodworking tool and, more particularly, to a guard for use with a jointer in which the guard includes a featherboard for biasing a workpiece into contact with a guide fence of the jointer.

A typical jointer includes a work supporting table, a cutting element or cutter head and a guide fence wherein the cutting table is formed with front and rear halves and a table apron extending along an outer edge of the front and rear halves opposite from the cutting element and the fence. The front and rear halves are vertically adjustable relative to each other such that, as the difference in height between the two halves is increased, the amount that the cutting element is exposed to a workpiece is also increased. Thus, the amount of material cut from a workpiece is dependent upon the height difference between the front and rear halves of the table and it is essential that the workpiece be held in contact with these table portions as it is moved past the cutting element.

In a typical jointing operation, the operator must force the workpiece sideways into the guide fence while also pushing down to insure that the workpiece is in constant contact with the table top. The operator initially applies a greater force to the workpiece resting on the rear half of the table and, as the workpiece progresses through the jointer, the operator must transfer a greater amount of force to the portion of the workpiece resting on the front half of the table. Thus, the hands of the operator are typically located either above or to the side and in close proximity to the cutting element during the jointing operation which may lead to a dangerous situation if a kickback of the workpiece should occur wherein the workpiece is kicked out of the jointer such that it no longer separates the operator's hand from the cutting element.

The danger presented by jointers has to a large extent been eliminated by the use of guard eements which are typically mounted to the jointer apron and are biased into position over the cutting element when a workpiece is not being fed through the jointer. A problem with current guard designs is that as the workpiece approaches the guard it pushes the guard away from the cutting element such that a path is cleared between the guard and the guide fence. While such a guard design has been adequate for protecting the operator's fingers from the cutting element in most situations, occasions may still arise where the jointer kicks the workpiece out of position between the guard and the guide fence in a manner such that the operator's fingers may enter the space between the guard and the fence before the guard can swing back into position over the cutting element. Further, the movement of the guard away from the fence is not limited in any manner such that under certain circumstances the guard may expose more of the cutting element than is necessary and thereby increase the risk of injury.

U.S. Pat. No. 2,895,517 to Rhett discloses a guard for jointers which is designed to overcome some of the above-mentioned problems. The guard disclosed by Rhett includes a housing which carries a plurality of fingers which are movable in a direction perpendicular to the guide fence of the jointer. As a workpiece enters the jointer, an angle plate causes the fingers to move out of the path and to a position spaced from the workpiece until the trailing edge of the workpiece passes beyond the angled plate, at which time the fingers move into the space behind the rear edge of the workpiece. While the guard of Rhett addresses the problem of covering the cutting space as the workpiece passes out of the cutting area to thereby prevent the operator's fingers from contacting the cutting element, this guard is still ineffective in preventing injuries which might occur as a result of the guard moving away from the guide fence a distance greater than the width of the workpiece and does not address the problems which may occur during kickback of the workpiece from the jointer cutting element.

Accordingly, there is a need for a guard for use with a jointer in which the movement of the guard away from the guide fence may be limited to a distance substantially equal to the width of the board being cut such that the exposure of the cutting element may be minimized. In addition, there is a need for a guard which will provide increased control of the workpiece as it is fed through the jointer whereby the amount of force applied by the operator toward the workpiece, and thus toward the cutting element of the jointer, is also minimized.

Further, there is a need for a jointer guard which is capable of decreasing the severity of kickback situations during the operation of the jointer such that the danger using from the operator losing control of the workpiece is kept to a minimum.

SUMMARY OF THE INVENTION

The present invention provides a guard for use with a woodworking tool such as a jointer having a substantially planar work support table, a cutting element or cutter head and a workpiece guide fence for guiding a workpiece over the cutting element and between the guard and the fence.

The guard of the present invention includes a guard body portion which is adapted to be attached to a jointer table by an elongated stud which forms a pivot point such that the body portion may pivot about a vertical axis toward and away from the fence. The elongated stud is surrounded by a helical torsion spring which forms a biasing means for biasing the body portion to pivot toward the fence.

Means are provided for limiting the pivotal movement of the body portion away from the fence and include an arcuate slot which is shaped with a center of curvature located at the pivot point formed by the elongated stud. A first stop means in the form of a bolt is located within the slot and may be adjusted to different positions along the length of the slot. A second stop means in the form of a pin is adapted to be attached to the jointer table and extend into the arcuate slot for engagement with the first stop means. Thus, the body portion may pivot away from the fence to an extent limited by engagement between the first and second stop means.

The guard further includes anti-kickback means in the form of elongated featherboard fingers extending from the body portion and adapted to be positioned over the cutter head of the jointer. The anti-kickback fingers are preferably formed integrally with the guard body and, when in position on the jointer table, are angled in the feed direction of a workpiece undergoing a jointing operation.

The guard fingers are formed of a resilient material such that the first stop means may be adjusted to locate the fingers within the path of the workpiece when the body portion is at the outer limit of its pivotal movement away from the fence. Thus, as a workpiece is fed through the jointer, it causes the guard fingers to pivot relative to the body portion and a first biasing force is exerted on the workpiece by the fingers in a direction toward the guide fence.

In addition, when a kickback force is applied to the workpiece in a direction opposite from the feed direction, the fingers are caused to pivot toward the workpiece whereby they exert a second force against the workpiece which is greater than the first force exerted during feeding of the workpiece, and movement of the workpiece in the kickback direction is resisted.

Accordingly, the present invention provides a guard for use with a woodworking tool such as a jointer in which the guard may be adjusted to expose the cutter head to an extent equal to or less than the width of the workpiece being operated upon. The present guard also provides increased safety against accidental contact with the cutting head by forcing the workpiece into the guide fence and thereby provides increased control during feeding of the workpiece over the cutter head In addition, the severity of kickback situations is decreased as a result of using resiliently pivoted fingers which provide an increased biasing force toward the guide fence in the event of the workpiece moving toward the kickback direction.

Other objects and advantages of the invention will be apparent from the following description, the accompanying drawings and the appended claims.

BRIEF DESCRIPTION OF THE DRAWINGS

FIG. 2 is a cross section of the guard taken along the line 2—2 of FIG. 1;

FIG. 3 is a cross section of the guard taken along the line 3—3 of FIG. 1; and

DETAILED DESCRIPTION OF THE PREFERRED EMBODIMENT

Figure 1:
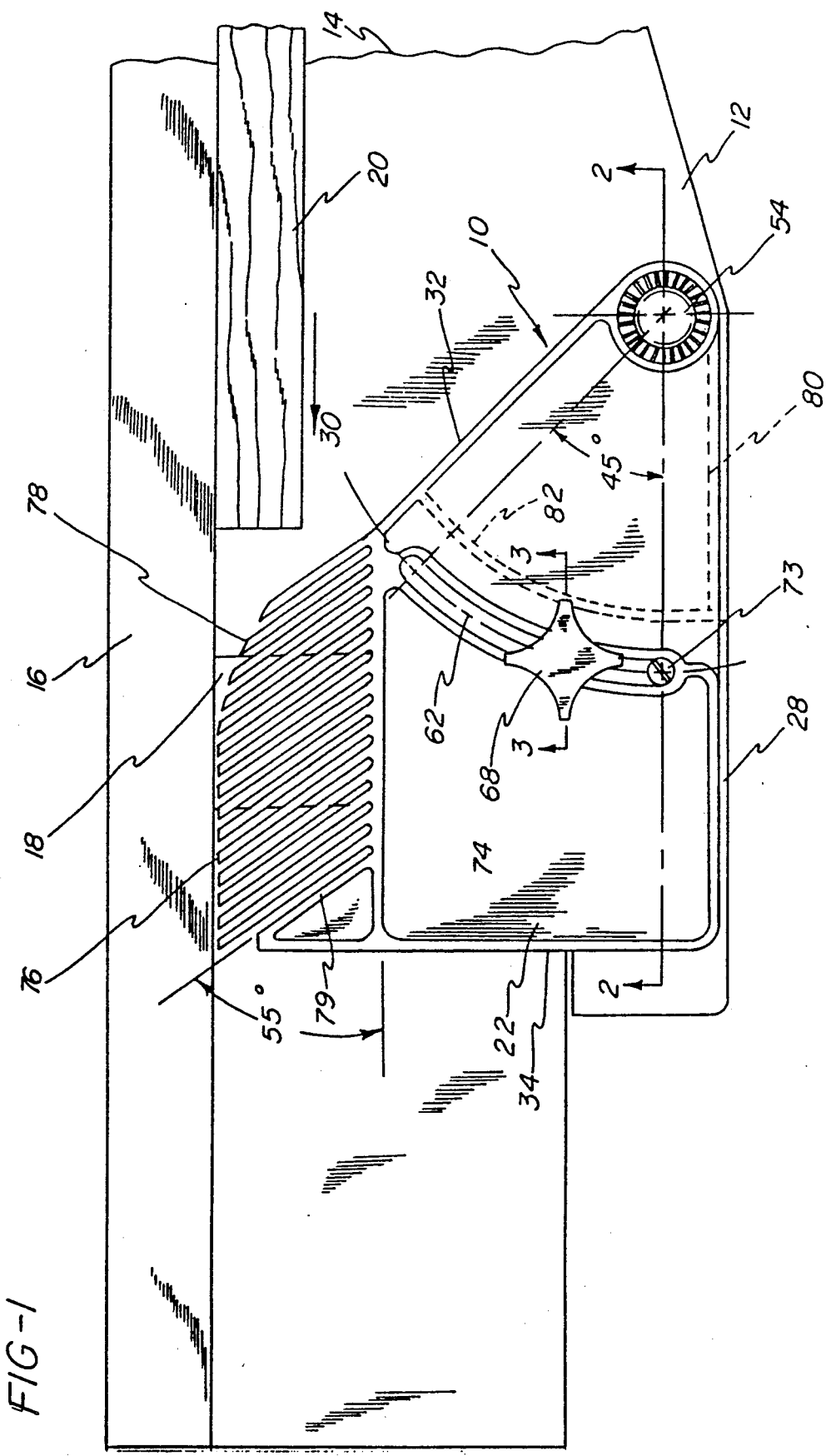
FIG. 1 is a plan view of the guard of the present invention in position on a jointer table.

As may be seen with reference to FIG. 1, the guard 10 of the present invention may be mounted to the apron portion 12 of a jointer table 14 such that the guard 10 extends toward a guide fence 16 and overlaps a cutter head 18 of the jointer. Thus, the guard 10 is positioned to engage a side of a workpiece 20 being fed through the jointer along the fence 16 such that guard 10 and fence 16 engage the workpiece on opposite sides thereof.

Referring to FIGS. 1 and 2, the guard includes a body portion 22 which has upper and lower sides 24, 26, respectively, and first and second substantially parallel longitudinal edges 28, 30 which are connected by opposing third and fourth edges 32, 34. The third edge extends from the first edge 28 to the second edge 30 at approximately a 45° angle and a pivot hole 36 for the guard extends through the guard body portion 22 at a location adjacent to the intersection of the first and third edges 28, 32.

An elongated pivot stud 38 is positioned within the pivot hole 36 and includes an upper threaded portion 40 which extends above the upper side 24 of the guard body 22 and a lower threaded portion 42 which extends below the lower side 26 of the guard body 22. The pivot stud 38 includes a hexagon-shaped portion 44 adjacent to the lower threaded portion 42 which may be engaged in a hexagon-shaped aperture formed in the jointer table apron 12 to thereby prevent rotation of the pivot stud 38 relative to the jointer table.

A first retaining ring 46 is attached to the pivot stud 38 adjacent to the hexagon-shaped portion 44 and is positioned such that it may engage the upper surface of the jointer table apron 12. A nut 48 is positioned on the lower threaded portion 42 for engaging the lower surface of the jointer table apron 12 to thereby rigidly position the stud 38 on the jointer.

A second retaining ring 50 is attached to the stud 38 above the first retaining ring 46 and positions a washer 51 in engagement with a shoulder portion 52 of the hole 36 to prevent the pivot stud 38 from moving upwardly out of the guard body portion 22. A threaded cap 54 is attached to the upper threaded portion 40 of the stud 38 to thereby prevent the stud 38 from moving downwardly out of the guard body 22. Thus, the cap 54 and the retaining ring 50 and washer 51 act to vertically locate the stud 38 within the guard body 22 while permitting relative rotation between the stud 38 and the body 22.

The guard body 22 is biased for rotation toward the jointer fence 16 by means of a helical torsion spring 56 which surrounds the pivot stud 38. A first end 58 of the spring 56 is attached to the guard body portion 22 and an opposite end 60 of the spring 56 is attached to the stud 38. Thus, as a workpiece 20 passes through the jointer, the workpiece 20 will cause the guard 10 to pivot about the pivot stud 38 against a torsional force applied by the spring 56. After the workpiece has traveled past the guard 10, the spring 56 will bias the guard 10 back into position over the cutter head 18.

Figure 4:
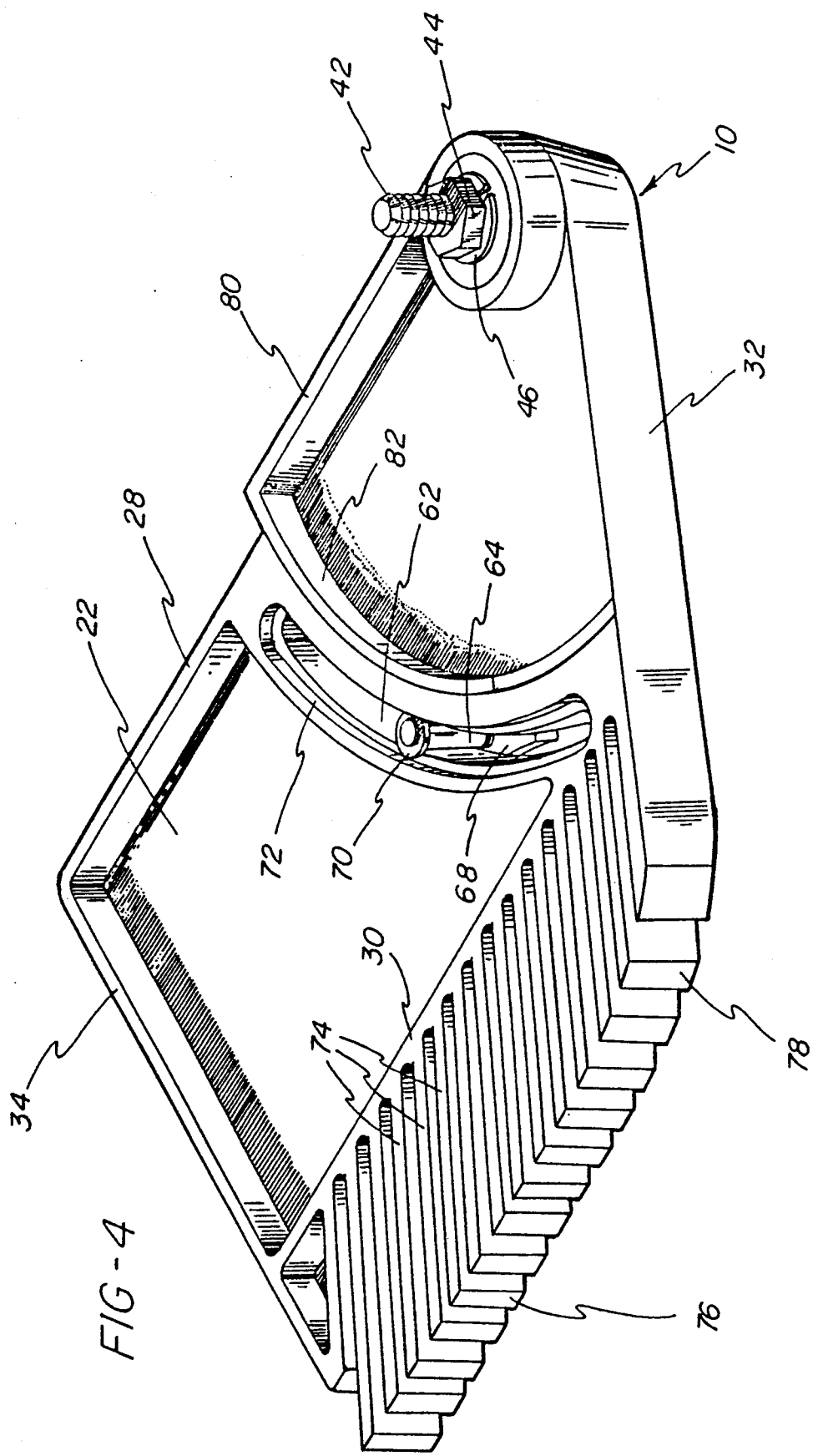
FIG. 4 is a perspective view taken from the bottom of the guard of the present invention.

Referring to FIGS. 3 and 4, the guard body 22 is further provided with an adjustment assembly which includes an arcuate slot 62 having a center of curvature at the pivot hole 36 and an adjustment bolt 64 having a threaded end 66 which extends through the arcuate slot 62 to engage an adjustment knob 68. The end of the bolt 64 opposite from the threaded end 66 includes a head portion 70 having opposing flat sides which is seated in an enlarged lower portion 72 of the arcuate slot 62 such that the bolt 64 is prevented from rotating relative to the guard body 22 by engagement of the flat sides of the head portion 70 with the sides of the slot 62. The adjustment bolt 64 is movable within the slot 62 and may be selectively locked in position by turning the adjustment knob 68 to draw the knob 68 and bolt 64 together for firmly engaging opposing sides of the guard body 22.

The adjustment bolt 64 acts as a first stop which cooperates with a stop pin 73 (see FIGS. 1 and 2) to limit pivotal movement of the guard 10 away from the jointer fence 16. The stop pin 73 is adapted to be rigidly mounted in the jointer table apron 12 and is preferably aligned with the elongated pivot stud 38 along a line substantially parallel to the guide fence 16. Thus, the adjustment knob 68 may be used to locate the adjustment bolt 64 in different positions within the arcuate slot 62 to control the amount of pivotal movement of the guard 10 and thereby control the amount of exposure of the cutter head 18 during the guard's pivotal movement.

Referring to FIGS. 1 and 4, it can be seen that a plurality of elongated flexible fingers 74 extend from the second longitudinal edge 30 of the body portion 22 to form a featherboard portion of the guard 10. The fingers 74 extend from the second longitudinal edge 30 at approximately a 55° angle such that the fingers 74 are angled forwardly in the feed direction of a workpiece 20. The outer ends of the flexible fingers 74 define a first outer guard edge portion 76 which is oriented substantially parallel to the first and second longitudinal edges 28, 30, and a second outer guard edge portion 78 which forms a smoothly curved transition from the first edge portion 76 toward the third edge 32 of the body portion 22. The fingers 74 are formed of a flexible material such as ABS plastic and are preferably integrally formed with the body portion 22 such that the body portion 22 and fingers 74 may be formed as a unitary molded piece.

Since the fingers 74 are formed as flexible members, the adjustment bolt 64 may be positioned within the slot 62 such that the fingers 74 are located in the path of a workpiece 20 when the adjustment bolt 64 is in engagement with the stop pin 73 at the limit of the pivotal movement of the guard body 22. Thus, the outer edges 76, 78 of the fingers 74 may be located in position to apply a first biasing force to a workpiece 20 in a direction toward the guide fence 16 such that the workpiece 20 is firmly held against the fence 16.

In addition, the fingers 74 may apply a second biasing force which is greater than the first biasing force against a workpiece 20 in the event that the cutter head 18 causes the workpiece 20 to move backwards in a direction opposite to the feed direction, such as might occur during a kickback situation. In this manner, the fingers 74 cause the workpiece 20 to firmly engage the fence 16 to resist movement of the workpiece 20 during kickback and thereby provide greater control during the cutting operation.

The pivotal movement of the flexible fingers 74 is limited by a finger brace 79 which is positioned on the second edge 30 adjacent to the fourth edge 34. By limiting the pivotal movement of the fingers 74, the finger brace 79 insures that the fingers 74 do not pivot beyond their elastic limit and break.

Referring to FIG. 4, a guard foot 80 is located on the lower side 26 of the guard 10 and forms a support for the guard 10 during its pivotal movement. The guard foot 80 extends from a point adjacent to the pivot stud 38 along the first edge 28 and toward the slot 62, and includes an arcuate portion 82 extending substantially parallel to the arcuate slot 62 from the first edge 28 toward the third edge 32. In addition, the lower surface of the guard foot 80 defines a lowermost extent of the guard body 22. The flexible fingers 74 are spaced upwardly from the lower surface of the guard foot 80 a distance of approximately one-half inch to thereby provide clearance for the fingers 74 to move past the cutter head 18.

In use, the guard 10 is bolted to the apron 12 of the jointer table 14 with the helical torsion spring 56 applying a biasing force on the body portion 22 toward the jointer fence 16 and the stop pin 73 is positioned extending upwardly through the slot 62. The adjustment bolt 64 and adjustment knob 68 are locked in the arcuate slot 62 in a position which will locate the outer edges of the flexible fingers 74 within a portion of the path of a workpiece 20 being conveyed through the jointer such that the fingers 74 may apply a first biasing force against the workpiece 20 when the adjustment bolt 64 is in engagement with the stop pin 73.

Thus, as the workpiece 20 is conveyed toward the cutter head 18, it first engages the second outer edge 78 of the fingers and causes the guard 10 to pivot outwardly away from the fence 16. As the workpiece 20 is conveyed further into the jointer, it engages the first outer portion 76 of the fingers 74 and causes the fingers 74 to pivot in the feed direction whereby the fingers 74 apply a force to maintain the workpiece against the guide fence 16. In the event of a kickback occurring, the fingers 74 act as anti-kickback means and force the workpiece 20 against the fence 16 with a second biasing force which is greater than the first biasing force to resist movement of the workpiece and thereby provide the operator with greater control over the workpiece than conventional guard members.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A guard for use with a woodworking tool having a substantially planar worktable, a workpiece guide fence and a cutting element, said guard comprising:
   a body portion for attachment to said worktable adjacent to said cutting element;
   biasing means for resiliently biasing said body portion toward said guide fence such that said body portion is movable relative to said guide fence in a plane substantially parallel to said worktable; and
   a plurality of elongated finger portions extending from said body portion for overlying said cutting element, said finger portions being pivotable relative to said body portion in a plane substantially parallel to said worktable whereby said finger portions may exert a biasing force on a workpiece away from said body portion.

2. The guard of claim 1 wherein said biasing means includes a pivot stud for attaching said body to said worktable and spring means for biasing said body portion to pivot about said stud.

3. The guard of claim 1 including adjusting means for adjusting the force applied by said fingers on said workpiece.

4. The guard of claim 3 wherein said adjusting means includes means for limiting the movement of said body portion away from said guide fence.

5. The guard of claim 4 wherein said adjusting means includes a slot formed in said body portion and first stop means positioned within said slot and adjustable to different positions within said slot, and second stop means mounted in said worktable for engaging said first stop means whereby the movement of said body portion is limited.

6. The guard of claim 1 wherein said fingers may be positioned to successively engage the leading edge of a workpiece being fed toward said cutting element such that said fingers are caused to pivot toward the feed direction of the workpiece.

7. The guard of claim 6 including adjusting means to limit the movement of said body portion away from said guide fence whereby said fingers are positioned in the path of a workpiece being fed toward said cutting element.

8. The guard of claim 1 wherein said fingers are formed integrally with said body portion 9. A guard for use with a jointer having a work support table, a cutting element and a workpiece guide fence for guiding a workpiece over said cutting element and between said guard and said fence, said guard comprising:
- a body portion attached to said table at a pivot point defining a vertical pivot axis such that said body portion may pivot toward and away from said fence in a plane substantially parallel to said table;
- biasing means located at said pivot point for resiliently biasing said body portion toward said fence;
- a plurality of resilient fingers extending from said body portion for engaging and exerting a biasing force on a workpiece passing between said fence and said guard; and
- adjusting means for adjusting the force applied by said fingers on the workpiece, said adjusting means including a slot formed in said body portion and first stop means adjustable to different stationary positions within said slot and second stop means for mounting in said worktable to engage said first stop means and thereby prevent movement of said body portion about said pivot point.

10. The guard of claim 9 wherein said first stop means may be positioned in said slot such that said fingers will be located in the path of a workpiece being fed between said fence and said guard when said first stop means engages said second stop means.

11. The guard of claim 9 wherein said pivot point includes an elongated stud and said biasing means includes a helical torsion spring surrounding said stud.

12. The guard of claim 9 wherein said slot is arcuately shaped with a center of curvature located at said pivot point.

13. The guard of claim 9 wherein said fingers are formed integrally with said body portion 14. A guard for use with a jointer having a jointer table and a workpiece guide fence, said guard comprising:
- a guard body having an upper and a lower side and first and second substantially parallel longitudinal edges:
- a third edge connected to and extending from said first edge at approximately a 45° angle and connecting said first and second edges;
- means defining a pivot hole adjacent to the connection between said first and third edges;
- an elongated pivot stud positioned within said pivot hole and including upper and lower threaded portions extending beyond said upper and lower sides of said guard body;
- said pivot stud having a hexagon shaped portion adjacent to said lower threaded portion for engaging in said jointer table and preventing rotation of said pivot stud relative to said jointer table;
- a first retaining ring attached to said pivot stud adjacent to said hexagon shaped portion for engaging an upper surface of said jointer table;
- a second retaining ring attached to said pivot stud above said first retaining ring, said pivot hole including a shoulder portion and said second retaining ring cooperating with said shoulder portion for preventing said pivot stud from moving upwardly out of said guard body;
- a threaded cap attached to said upper threaded portion for preventing said pivot stud from moving downwardly out of said guard body;
- a helical torsion spring surrounding said pivot stud and having one end connected to said guard body and an opposite end connected to said pivot stud whereby said spring may bias said guard for rotation relative to said pivot stud;
- an arcuate slot extending across said guard body from a point adjacent to the connection between said second and third edges toward said first edge, said slot having a center of curvature at said pivot hole;
- a stop pin adapted to be attached to said jointer table and extending into said arcuate slot;
- an adjustment assembly including an adjustment bolt having a threaded end extending through said arcuate slot and an adjustment knob attached to said threaded end of said adjustment bolt adjacent to the upper side of said guard, said arcuate slot including an enlarged lower portion and said bolt having a head with opposing flat sides received within said enlarged portion of said slot wherein said head prevents relative rotation between said adjustment bolt and said adjustment knob;
- a plurality of flexible fingers extending from said second edge at an angle of approximately 55° relative to said second edge, the outer ends of said flexible fingers defining an outer guard edge including a first portion which is substantially parallel to said second edge and a second portion which forms a smoothly curved transition toward said third edge; and
- wherein said adjustment assembly may be set to a desired position within said slot such that a workpiece engaging said flexible fingers may cause said guard to pivot about said pivot stud against the force of said helical spring until said adjustment bolt contacts said stop pin whereupon said flexible fingers may flex to permit passage of said workpiece through said jointer and force said workpiece against said guide fence.

* * * * *